April 23, 1957     G. R. CUTHBERTSON ET AL     2,789,616
METHOD OF FORMING SIDEWALL OF TIRE Filed April 25, 1955     3 Sheets-Sheet 1

INVENTOR.
GEORGE R. CUTHBERTSON
EDWARD B. ERICKSON
BY    ANDREA J. FONTANA

Irwin M. Lewis
ATTORNEY.

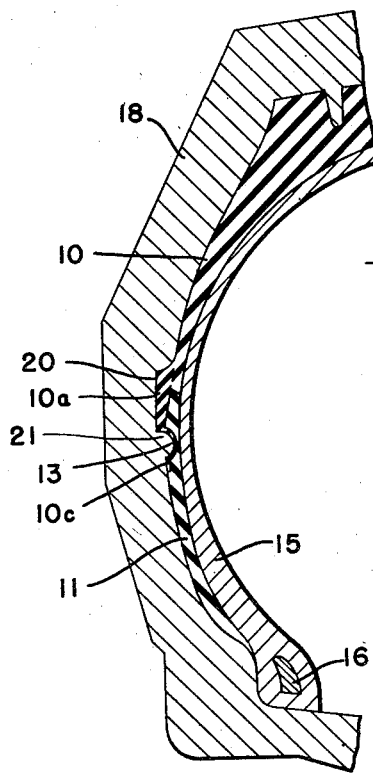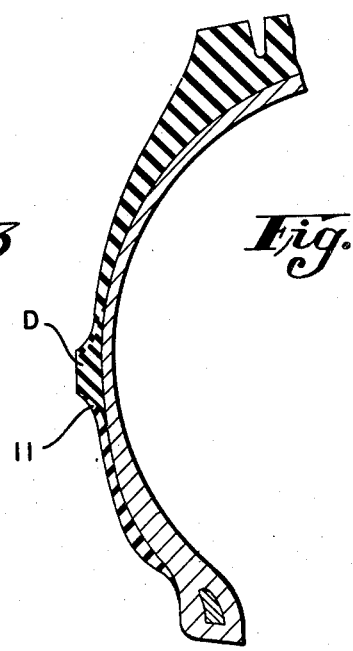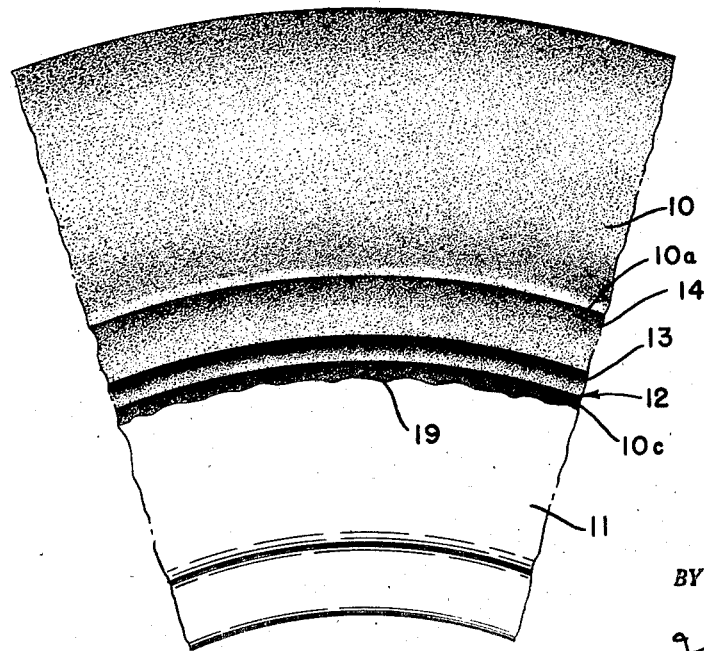

April 23, 1957  G. R. CUTHBERTSON ET AL  2,789,616
METHOD OF FORMING SIDEWALL OF TIRE
Filed April 25, 1955  3 Sheets-Sheet 3
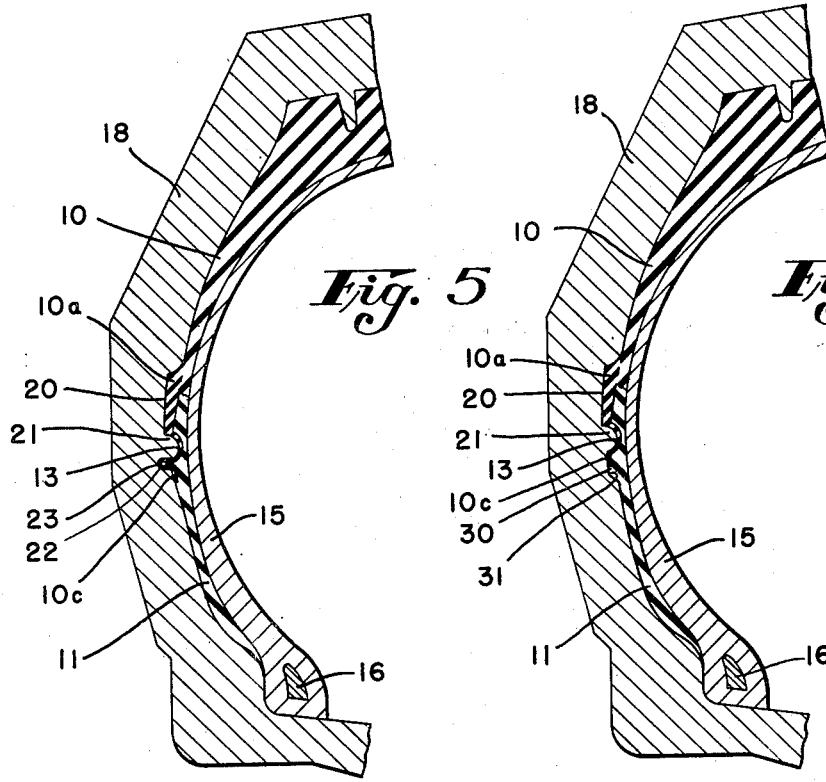
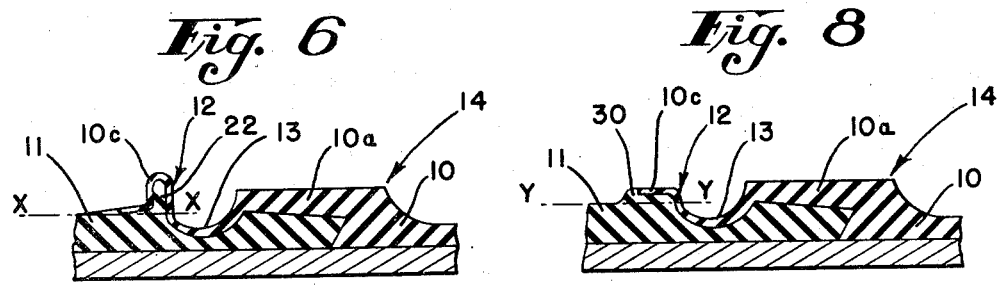
INVENTOR.
GEORGE R. CUTHBERTSON
EDWARD B. ERICKSON
BY ANDREA J. FONTANA
ATTORNEY.

મ2,789,616

Patented Apr. 23, 1957

2,789,616

METHOD OF FORMING SIDEWALL OF TIRE

George R. Cuthbertson, Ridgewood, N. J., and Edward B. Erickson, Grosse Pointe Woods, and Andrea J. Fontana, Detroit, Mich., assignors to United States Rubber Company, New York, N. Y., a corporation of New Jersey Application April 25, 1955, Serial No. 503,438

10 Claims. (Cl. 152—353)

This invention relates to the forming of the sidewall of a vehicle tire from a relatively dark rubber stock, usually black, and a lighter colored rubber stock, usually white, and to the forming of the externally visible line of juncture between the two stocks. The term "rubber" is used to include both natural and synthetic rubber or combinations thereof.

From an appearance standpoint it is important that the visible line of juncture between the dark stock and the lighter stock in the finished tire be even and regular. It is impossible, however, to obtain an even regular line of juncture merely by careful fabrication, as in the subsequent vulcanization or curing of the tire there is necessarily uneven flow of the two stocks with the result that the visible line of juncture in the finished tire is uneven and irregular.

One method heretofore used to obtain an even, regular visible line of juncture between the contrasting stocks, has been to lap the lighter stock over the darker stock during fabrication (the tire of course being initially fabricated of unvulcanized stocks) and then form, during subsequent vulcanization, an outwardly projecting circumferentially extending rib at the line of juncture between the two stocks so that the uneven, irregular line of juncture appears on the outer surface of the rib. The outer surface of the rib is then buffed or otherwise cut down to remove all of the overlapped lighter stock to thereby give an even, regular line of juncture between the two stocks at the corner of the rib. The rib so formed is commonly referred to as a "buffing rib." This particular method of forming the line of juncture between the two stocks is described in U. S. Patent No. 1,940,077, which was assigned to the same assignee as the instant application.

While this method is quite satisfactory in regard to the evenness of the resulting line of juncture between the two stocks, it does have certain disadvantages. One disadvantage is that the dark antioxidants and accelerators used in the darker stock tend to blend through or stain the overlapping lighter colored stock, particularly adjacent the buffing rib where the lighter stock is relatively thin. If this "bleed through" or staining is to be avoided, a barrier layer of non-bleeding or non-staining stock must be provided between the darker and lighter stocks. This requires the use of a more expensive, non-staining barrier stock as well as an extra fabrication step.

Another disadvantage is that the buffing rib must, in some instances be buffed down to such an extent to remove all of the lighter colored stock that the rib loses its sharp definition as originally molded, thereby detracting from the appearance of the tire. If a tire is made in accordance with U. S. Patent No. 2,572,259, i. e. the buffing rib is so proportioned and positioned as to protect the lighter colored sidewall stock from abrasion by curbs or the like, excessive buffing of the rib to remove all of the lighter stock may result in loss or decrease in the protective function of the rib.

The primary object of the present invention is to provide a novel method of forming an even, regular, externally visible line of juncture between the relatively dark and the lighter colored stock and at the same time eliminate both the necessity of buffing the buffing rib and the problem of the staining of the ligher stock inherent in the method heretofore used to attain such a line of juncture between the two stocks.

In accordance with the present invention, the darker stock is lapped over the lighter stock during fabrication in the unvulcanized state. In the subsequent vulcanization a circumferentially extending recess or groove is molded in the lapped portion of the dark stock adjacent the juncture line between the two stocks. In such subsequent vulcanization of the tire, an uneven irregular line of juncture between the two stocks appears on the side of the tire adjacent the groove. The overlapping dark stock is then buffed off or otherwise removed from the surface of the tire up to the groove so that an even, regular, externally visible line of juncture is formed substantially at the edge of the groove. No buffing of the buffing rib is necessary and there is no problem of "bleed through" or staining of the lighter stock as the darker stock laps the lighter stock.

Preferably, an outwardly projecting trim rib is formed at the edge of the groove or recess which may be trimmed to facilitate the formation of a sharp line of juncture between the stocks at the edge of the groove or recess. This trim rib may be of such size and shape that under ordinary manufacturing conditions the edge of the overlapping dark stock is located in this rib. Thus the excess dark stock and the trim rib may be ground off or otherwise removed without materially affecting the thickness of the finished sidewall.

Other objects and advantages of the present invention will become apparent from the following description when read in conjunction with the accompanying drawings wherein:

Fig. 1 is a perspective sectional view of a tire formed in accordance with the present invention, illustrating the even, regular, externally visible line of juncture between the darker and lighter colored rubber stocks formed at the edge of a recess or groove formed in the sidewall of the tire and also illustrates how the darker stock laps the lighter stock so that no "bleed through" or staining problem is presented;

Fig. 3 is a partial sectional view of a tire in the vulcanizing mold, showing the forming of the recess or groove in the overlapped black stock adjacent the line of juncture between the dark and lighter colored stocks;

Fig. 4 is a side elevational view of a section of the tire of Fig. 3 as removed from the mold, but before the darker overlapping stock is buffed off the surface of the tire adjacent the groove;

Fig. 5 is a partial sectional view of the tire in the vulcanizing mold showing the forming of an additional trim rib which contains the darker overlapping stock and permits the trimming of the overlapping darker stock adjacent the groove to form a sharp line of juncture at the edge of the groove or recess.

Fig. 6 is a fragmentary sectional view of the tire of Fig. 5 as removed from the mold, but before the trim rib has been removed;

Fig. 7 is a partial sectional view of the tire in the vulcanizing mold showing a modified form of tirm rib;

Fig. 8 is a fragmentary sectional view of the tire of Fig. 7 as removed from the mold, but before the trim rib has been removed, and Fig. 9 is a partial sectional view of a tire manufactured in accordance with the method of U. S. Patent No. 1,940,-077 to show by comparison that the lighter colored stock laps the darker stock even in the finished tire thereby presenting a staining problem.

Figure 1:
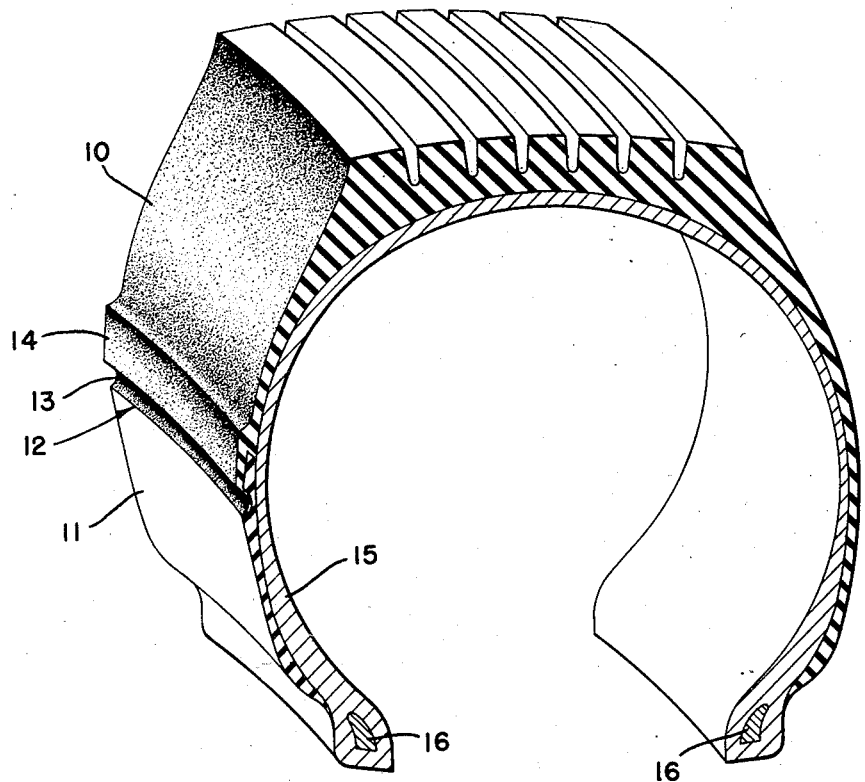

Referring to the drawings, and in particular to Fig. 1 in which there is shown a fragment of a finished tire formed in accordance with the present invention, the darker rubber stock 10 overlaps the lighter colored sidewall stock 11. The visible line of juncture between the darker stock 10 and the lighter stock 11 is formed substantially at the edge 12 of a circumferentially extending recess or groove 13 formed in the marginal edge of the overlapping dark stock 10 adjacent the usual buffing rib 14. The tire is otherwise of conventional construction and includes a fabric carcass 15 and inextensible annular bead wire bundles 16 to which the carcass is anchored during vulcanization. The externally visible surface of the lighter stock 11 extends continuously from the juncture with the black stock approximately to the bead area in a substantially uninterrupted plane. The recess 13 is depressed into the plane of the lighter stock.

It will be particularly noted that the darker stock 10 overlies the lighter stock 11 and that therefore, in contrast to tires constructed in accordance with the method of U. S. Patent No. 1,940,077, of which Fig. 9 is illustrative, there is no problem of the darker stock staining or bleeding through the lighter stock. Accordingly, there is no necessity of using a non-staining barrier stock between the darker stock and the lighter stock as would be necessary in the construction illustrated in Fig. 9 if staining of the lighter stock L by the darker stock D is to be avoided.

Figure 2:
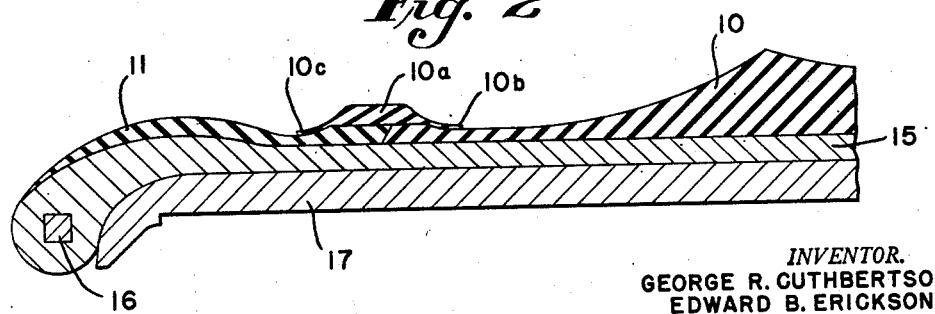
Fig. 2 is a partial sectional view of a raw, unvulcanized tire as fabricated on a tire building drum illustrating the lapping of the dark stock over the lighter colored stock in the fabrication step.

The lapping of the darker stock 10 over the lighter stock 11 is performed during fabrication of the tire on the tire building drum. As illustrated in Fig. 2, in which the tire building drum is identified by the reference character 17, the overlapped portion of the darker stock 10 is preferably in the form of and applied as a separate cover strip 10a. The cover strip 10a is quite thick except at the edges thereof which are tapered down to provide thin marginal sections 10b and 10c. The thicker portion of the cover strip 10a forms the buffing rib 14 in the finished tire. The advantage of providing the overlapping portion of the dark stock as a separate strip, such as the cover strip 10a, is that a dark stock exhibiting different characteristics than the remaining dark stock may be used. For example, it has been found advantageous to use a dark neoprene rubber for the cover strip 10a. If preferred, however, the cover strip 10a may be made of the same stock as the remaining dark stock 10 and made as an integral part of the remaining dark stock 10 rather than as a separate strip. As will be obvious to those skilled in the art, the stocks are of course in a raw or unvulcanized condition during the fabrication or building stage depicted in Fig. 2.

The fabricated tire is next removed from the tire building drum 17 and shaped to approximate tire shape in any conventional manner and vulcanized and molded in a tire mold 18 as illustrated in Fig. 3. During the molding operation the buffing rib 14 and the recess or groove 13 are formed on the side of the tire. The recess 13 is formed in the overlapped thin section of the dark stock so that the externally visible line of juncture between the dark stock 10 and the lighter stock 11 appears as an irregular line 19 on the side of the tire adjacent the edge 12 of the recess or groove 13 when the tire is removed from the mold 18 as illustrated in Fig. 4. The buffing rib 14 is formed by a recess 20 in the mold 18 and the recess or groove 13 is formed by a rib 21 on the inner surface of the mold 18.

After the tire has been removed from the mold 18, the surface of the tire adjacent the groove 13 is buffed or ground down to remove the overlapped dark stock 10c and thereby expose the underlying lighter stock 11 substantially up to the edge 12 of the groove 13. This removal of the overlapping dark stock 10c automatically forms an even, regular, and sharply defined externally visible line of juncture between the dark stock 10 and the lighter stock 11 substantially at the edge 12 of the groove 13. The line of juncture is separated from the edge 12 of the groove 13 only by the thickness of the layer of dark stock 10 in the groove. This layer of stock in the groove 13 is quite thin being necessarily thinned out by the flow thereof during the forming of the groove 13.

To facilitate the formation of a sharp, even line of juncture between the dark and light stocks during the grinding or buffing off of the overlapping dark stock 10c adjacent the groove 13, an outwardly projecting, circumferentially extending trim rib 22 is preferably formed on the sidewall surface of the tire at the inner edge of the groove 13 as shown in Figs. 5 and 6. The trim rib 22 is formed by providing an additional recess or groove 23 in the surface of the mold 18 as shown in Fig 5. The trim rib 22 may be of any desired size and shape, i. e., it may be relatively wide as shown in Figs. 7 and 8, relatively thin as shown in Figs. 5 and 6, or some intermediate shape.

The trim rib 22 (shown in Figs. 5 and 6) is of a size that the edge of the overlapping dark stock extends into and frequently a short distance beyond the rib 22. To remove the black stock, the trim rib 22 and the black stock beyond the rib is merely ground off or otherwise removed to the approximate plane indicated by line X—X in Fig. 6 (which plane is essentially the plane of the outward or externally visible surface of the lighter stock 11) to expose the lighter stock 11 substantially up to the edge 12 of the groove 13 to thereby form an even, regular, externally visible line of juncture between the two stocks. The provision of the trim rib minimizes the possibility of excessive thinning of the sidewall of the tire during the grinding or buffing operation.

In the modification shown in Figs. 7 and 8 a relatively wide, flat trim rib 30 is formed on the tire by means of a suitably shaped recess 31 in the mold. This trim rib 30 extends above the normal finished surface or contour of the light sidewall and is of sufficient width that under ordinary factory tolerances and manufacturing conditions the edge 10c of the overlapping dark stock is located in this rib. Thus, when the trim rib is buffed or ground off to the approximate plane indicated by the line y—y in Fig. 8 (which plane is essentially the plane of the externally visible surface of the lighter stock 11) the excess dark stock is removed to the edge 12 of the groove 13 without thinning or materially affecting the thickness of the finished sidewall. This also provides a sharp, regular, externally visible line of juncture between the two stocks.

From the foregoing it will be apparent that in each of the several forms of the invention the buffing operation is simplified, due to the provision of the groove or recess 13 which insures an even, regular, sharply defined juncture between the different colored stocks.

Having thus described our invention, what we claim and desire to protect by Letters Patent is:

1. A method of forming the sidewall of a tire from a relatively dark colored rubber stock and a lighter colored stock and forming the externally visible line of juncture between the two stocks comprising, applying the two stocks to the carcass of a tire and applying a cover strip of dark stock over the line of juncture between the dark and light stock with a marginal portion of the cover strip lapping over the lighter stock, the said stocks being in an unvulcanized condition, forming during subsequent molding and vulcanization of the tire an annular groove depressed into the overlapped marginal portion of the cover strip, and after vulcanization removing the overlapped stock of the cover strip from the exterior surface of the tire adjacent the groove to expose the lighter stock up to the edge of the groove whereby the externally visible line of juncture between the two stocks is formed substantially at the edge of the groove.

2. A method of forming the sidewall of a tire from a relatively dark colored rubber stock and a lighter colored rubber stock and forming the externally visible line of juncture between the two stocks comprising, lapping a marginal portion of the dark stock over the lighter stock during fabrication of the tire, the said stocks being in an unvulcanized condition, forming during subsequent molding and vulcanization of the tire an annular buffing rib projecting outwardly from the dark stock and an annular groove depressed into the dark stock near the lapped marginal portion of the dark stock, and after vulcanization removing any of the dark stock from the exterior surface of the tire adjacent the groove to expose the lighter stock up to the edge of the groove whereby the externally visible line of juncture between the two stocks is formed substantially at the edge of the groove.

3. A vehicle tire having a sidewall of a relatively dark colored stock and a lighter colored stock, the darker and lighter stocks being overlapped on the exterior of the tire, an annular recess depressed into the exterior surface of the overlapped stock, and the externally visible line of juncture between the two stocks being formed substantially at the edge of said recess, the entire externally visible surface of the lighter stock extending continuously from said line of juncture approximately to the bead area in a substantially uninterrupted plane, the said recess being depressed into the plane of the lighter stock.

4. A method of forming the sidewall of a tire from a relatively dark colored rubber stock and a lighter colored rubber stock and forming the externally visible line of juncture between the two stocks comprising, lapping a marginal portion of the dark stock over the lighter stock during fabrication of the tire, the said stocks being in an unvulcanized condition, forming during subsequent molding and vulcanization of the tire an annular groove depressed into the overlapped marginal portion of the stock, and after vulcanization removing any of the overlapped dark stock from the exterior surface of the tire adjacent the groove to expose the lighter stock whereby the externally visible line of juncture between the two stocks is formed substantially at the edge of the groove.

5. A vehicle tire having a sidewall of a relatively dark colored stock and a lighter colored stock, the darker stock extending from the tread area of the tire in the direction of the bead area, and being lapped over the lighter stock on the exterior of the tire, an annular rib projecting from the sidewall formed in the exterior surface of the overlapped dark stock, and an annular groove depressed into the overlapped dark stock contiguous with the side of the rib nearest the bead area, and the externally visible line of juncture between the two stocks being formed substantially at the edge of said groove located nearest the bead, the entire externally visible surface of the lighter stock extending continuously from said line of juncture approximately to the bead area in a substantially uninterrupted plane, the said groove being depressed into the plane of the lighter stock.

6. A vehicle tire having a sidewall of a relatively dark colored stock and a lighter colored stock, the darker stock being lapped over the lighter stock on the exterior of the tire, a circumferentially extending buffing rib projecting outwardly from the sidewall formed in the dark stock, an annular groove depressed into the exterior surface of the overlapped dark stock adjacent the buffing rib, and the externally visible line of juncture between the two stocks being formed at the edge of said groove remote from said buffing rib, the entire externally visible surface of the lighter stock extending continuously from said line of juncture approximately to the bead area in a substantially uninterrupted plane, the said groove being depressed into the plane of the lighter stock.

7. A method of forming the sidewall of a tire from a relatively dark colored rubber stock and a lighter colored rubber stock and forming the externally visible line of juncture between the two stocks comprising, lapping a marginal portion of the dark stock over the lighter stock during fabrication of the tire, the dark stock extending from the tread area of the tire toward the bead area, the said stocks being in an unvulcanized condition, forming during subsequent molding and vulcanization of the tire an annular rib projecting from the side wall in the overlapped portion of dark stock, similarly forming an annular groove depressed into the sidewall at the side of said projecting rib located toward the bead area, and after vulcanization removing any of the overlapped dark stock from the exterior surface of the tire adjacent the edge of the groove located toward the bead area to expose the lighter stock up to the said edge of the groove whereby the externally visible line of juncture between the two stocks is formed substantially at the said edge of the groove.

8. A method of forming the sidewall of a tire from a relatively dark colored rubber stock and a lighter colored rubber stock and forming the externally visible line of juncture between the two stocks comprising, lapping a marginal portion of the dark stock over the lighter stock during fabrication of the tire, the dark stock extending from the tread area of the tire toward the bead area, the said stocks being in an unvulcanized condition, forming during subsequent molding and vulcanization of the tire an annular rib projecting from the sidewall in the overlapped portion of the dark stock, similarly forming an annular groove depressed into the sidewall at the side of said projecting rib located toward the bead area, and after vulcanization grinding down the surface of the tire adjacent the edge of the groove located toward the bead area to remove all of the overlapped dark stock and expose the lighter stock up to the said edge of the groove whereby the externally visible line of juncture between the two stocks is formed substantially at the said edge of the groove.

9. A method of forming the sidewall of a tire from a relatively dark colored rubber stock and a lighter colored rubber stock and forming the externally visible line of juncture between the two stocks comprising, lapping a marginal portion of the dark stock over the lighter stock during the fabrication of the tire, the said stocks being in an unvulcanized condition, forming during subsequent molding and vulcanization of the tire in the overlapped portion of the dark stock, an annular buffing rib projecting from the sidewall, an annular groove depressed into the dark stock adjacent to said buffing rib, and an additional annular projecting trim rib at the edge of said groove located away from said buffing rib, the said trim rib being located approximately at the marginal edge of the overlapped dark stock whereby the marginal edge of the overlapped dark stock extends into the trim rib, and, after vulcanization, removing the trim rib to expose the lighter stock up to the edge of the groove whereby the visible line of juncture between the two stocks is formed substantially at the edge of the groove.

10. A method of forming the sidewall of a tire from a relatively dark colored rubber stock and a lighter colored rubber stock and forming the externally visible line of juncture between the two stocks comprising, applying the two stocks to a fabric carcass, applying a cover strip of dark stock over the line of juncture between the dark and light stock with a marginal portion of the cover strip lapping over the lighter stock, the said stocks being in an unvulcanized condition, forming during subsequent molding and vulcanization of the tire, in the overlapped portion of the dark stock, an annular buffing rib projecting from the black stock, an annular groove depressed into the black stock at the side of said rib, and an additional annular projecting trim rib at the side of the groove of a size that the marginal edge of the lapped dark stock of the cover strip extends therein, and after vulcanization removing the trim rib to expose the lighter stock up to the edge of the groove whereby the visible line of juncture between the two stocks is formed substantially at the edge of the groove.

References Cited in the file of this patent

UNITED STATES PATENTS

| | | |
|---|---|---|
| 1,940,077 | Coe | Dec. 19, 1933 |
| 2,572,259 | Gottschall | Oct. 13, 1951 |
| 2,679,277 | Gray | May 25, 1954 |
| 2,685,904 | Brandau | Aug. 10, 1954 |
| 2,761,489 | Kraft | Sept. 4, 1956 |